United States Patent
Weber (10) Patent No.: US 6,631,448 B2
(45) Date of Patent: Oct. 7, 2003

(54) CACHE COHERENCE UNIT FOR INTERCONNECTING MULTIPROCESSOR NODES HAVING PIPELINED SNOOPY PROTOCOL

(75) Inventor: Wolf-Dietrich Weber, La Honda, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/041,568

(22) Filed: Mar. 12, 1998

(65) Prior Publication Data

US 2001/0013089 A1 Aug. 9, 2001

(51) Int. Cl.$^7$ ............................................... G06F 12/08
(52) U.S. Cl. ..................... 711/141; 711/144; 711/145; 711/146; 711/119
(58) Field of Search ............................... 711/141, 144, 711/145, 146, 119; 709/213, 216, 218, 251

(56) References Cited

U.S. PATENT DOCUMENTS

| | | | |
|---|---|---|---|
| 5,029,070 A | 7/1991 | McCarthy et al. | 711/143 |
| 5,297,269 A | 3/1994 | Donaldson et al. | 711/145 |
| 5,448,698 A | 9/1995 | Wilkes | 709/245 |
| 6,490,630 B1 * | 12/2002 | Poon et al. | 709/235 |
| 2002/0078304 A1 * | 6/2002 | Masri et al. | 711/134 |
| 2002/0178306 A1 * | 11/2002 | Shimizu | 710/56 |

FOREIGN PATENT DOCUMENTS

| | | |
|---|---|---|
| EP | 0817076 | 1/1998 |
| EP | 0820016 | 1/1998 |

OTHER PUBLICATIONS

Lenoski, Daniel, et al., "The Directory–Based Cache Coherence Protocol for the DASH Multiprocessor", Proceedings of the 17$^{th}$ Annual International Symposium on Computer Architecture, ACM Press, 1990; pp. 148–159.*

Lenoski, Daniel, et al., "The DASH Prototype: Implementation and Performace", Proceedings of the 19th Annual International Symposium on Computer Architecture, ACM Press, 1992; pp. 92–103.*

Stenstrom, Per et al., "Comparative Performance Evaluation of Cache–Coherent NUMA and COMA Architectures", Computer Architecture News, vol. 20, No. 2, May 1992;pp 80–91.*

Roy Clark & knut Alnes, "SCI Interconnect Chipset & Adapter," pp. 221–228, Data General, *Symposium Record, Hot Interconnects IV*, Aug. 1996.

(List continued on next page.)

*Primary Examiner*—Reginald G. Bragdon
(74) *Attorney, Agent, or Firm*—Carr & Ferrell LLP (57) ABSTRACT

The present invention consists of a cache coherence protocol within a cache coherence unit for use in a data processing system. The data processing system is comprised of multiple nodes, each node having a plurality of processors with associated caches, a memory, and input/output. The processors within the node are coupled to a memory bus operating according to a "snoopy" protocol. This invention includes a cache coherence protocol for a sparse directory in combination with the multiprocessor nodes. In addition, the invention has the following features: the current state and information from the incoming bus request are used to make an immediate decision on actions and next state; the decision mechanism for outgoing coherence is pipelined to follow the bus; and the incoming coherence pipeline acts independently of the outgoing coherence pipeline.

7 Claims, 9 Drawing Sheets

OTHER PUBLICATIONS

T. Lovett & R. Clapp, "STiNG: A CC–NUMA Computer System for the Commericial Marketplace," pp. 308–317, *Proceedings of the 23rd International Symposium on Computer Architecture*, May 1996.

Lenoski, D. and Weber, W. Scalable Shared–Memory Multiprocessing, 1995, pp. 205–236, Morgan Kaufmann Publishers, Inc., San Francisco, CA.

Hennessy, J. and Patterson, D. Computer Organization and Design, The Hardware/Software Interface, Second Edition, 1998, p. 436, Morgan Kaufmann Publishers, Inc., San Francisco, CA.

Lenoski, D. and Weber, W. Scalable Shared–Memory Multiprocessing, 1995, pp. xvii–xix, Morgan Kaufmann Publishers, Inc., San Francisco, CA.

U.S. patent application Ser. No. 09/281,714, James Christopher Wilson, filed Mar. 30, 1999.

* cited by examiner

CACHE COHERENCE UNIT FOR INTERCONNECTING MULTIPROCESSOR NODES HAVING PIPELINED SNOOPY PROTOCOL

BACKGROUND OF THE INVENTION

1. Field of Invention

The present invention generally relates to cache coherence for multiprocessor data processing systems, and more particularly to cache coherence for a plurality of multiprocessor nodes, each node having a snoopy bus protocol.

2. Discussion of the Background Art

Multiprocessor architectures are classified according to types of address space and memory organization. Address space architecture classifications are based upon the mechanism by which processors communicate. Processors communicate either by explicit messages sent directly from one processor to another or by access through shared-memory address space. The first classification is called a message passing architecture while the second is a shared-memory architecture.

Memory organization is classified as centralized or distributed. In a centralized organization memory system, the entire memory is located concentrically or symmetrically with respect to each processor in the system. Thus, each processor has equivalent access to a given memory location. In a distributed organization system, on the other hand, each processor within the multiprocessor system has an associated memory that is physically located near the processor; furthermore, every processor has the capability of directly address its own memory as well as the remote memories of the other processors. A distributed, shared-memory system is known as a distributed shared-memory (DSM) or a non-uniform memory access (NUMA) architecture.

DSM architecture provides a single shared address space to the programmer where all memory locations may be accessed by every processor. As there is no need to distribute data or explicitly communicate data between the processors in software, the burden of programming a parallel machine is simpler in a DSM model. In addition, by dynamically partitioning the work, DSM architecture makes it easier to balance the computational load between processors. Finally, as shared memory is the model provided on small-scale multiprocessors, DSM architecture facilitates the portability of programs parallelized for a small system to a larger shared-memory system. In contrast, in a message-passing system, the programmer is responsible for partitioning all shared data and managing communication of any updates.

The prior art provides numerous examples of DSM architectures. However, such systems communicate through high bandwidth buses or switching networks, and the shared-memory increases data latency. Latency is defined as the time required to access a memory location within the computer, and describes the bottleneck impeding system performance in multiprocessor systems. Latency is decreased in DSM systems by memory caching and hardware cache-coherence.

Caching involves placing high-speed memory adjacent to a processor where the cache is hardware rather than software controlled. The cache holds data and instructions that are frequently accessed by the processor. A cache system capitalizes on the fact that programs exhibit temporal and spatial locality in their memory accesses. Temporal locality refers to the propensity of a program to again access a location that was recently accessed, while spatial locality refers to the tendency of a program to access variables at locations near those that were recently accessed.

Cache latency is typically several times less than that of main system memory. Lower latency results in improved speed of the computer system. Caching is especially important in multiprocessor systems where memory latency is higher because they are physically larger, but caching does introduce coherence problems between the independent caches. In a multiprocessor system, it becomes necessary to ensure that when a processor requests data from memory, the processor receives the most up-to-date copy of the data to maintain cache coherence.

Protocols incorporated in hardware have been developed to maintain cache coherence. Most small-scale multiprocessor systems maintain cache coherence with a snoopy protocol. This protocol relies on every processor monitoring (or "snooping") all requests to memory. Each cache independently determines if accesses made by another processor require an update. Snoopy protocols are usually built around a central bus (a snoopy bus). Snoopy bus protocols are very common, and many small-scale systems utilizing snoopy protocols are commercially available.

To increase the processing power of computer systems, manufacturers have attempted to add more processing units to existing systems. When connecting additional microprocessors to the main bus to help share the workload, processing power is added linearly to the system while maintaining the cost-performance of the uni-processor. In such systems, however, bus bandwidth becomes the limiting factor in system performance since performance decreases rapidly with an increase in the number of processors.

In order to overcome the scaling problem of bus-based cache coherence protocols, directory-based protocols have been designed. In directory based systems, the state of each memory line is kept in a directory. The directory is distributed with memory such that the state of a memory line is attached to the memory where that line lives. The caches are kept coherent by a point-to-point cache coherence protocol involving the memory system and all the processor caches.

U.S. Pat. No. 5,029,070 to McCarthy et al. discloses a method for maintaining cache coherence by storing a plurality of cache coherency status bits with each addressable line of data in the caches. McCarthy et al. specifically rejects storing the plurality of cache coherency status bits in the global memory. A plurality of state lines are hardwired to the bus master logic and bus monitor logic in each cache. The state lines are ORed so that all the states of all the same type of cache coherency bits in every cache except for the line undergoing a cache miss appear on the state line. This allows the bus master to rapidly determine if any other cache has a copy of the line being accessed because of a cache miss.

U.S. Pat. No. 5,297,269 to Donaldson et al. discloses a system for point-to-point cache coherence in a multi-node processing system where the coherency is maintained by each main memory module through a memory directory resident on the individual memory module. The memories and nodes are coupled together by means of a cross bar switch unit coupled point-to-point to one or more main memory modules. The memory directory of each main memory module contains a plurality of coherency state fields for each data block within the module. Each main memory module maintains the coherency between nodes. The module queries its own directory upon each data transfer operation that affects the coherency state of a data block.

Sequent (T. Lovett and R. Clapp, StiNG, "A CC-NUMA Computer System for the Commercial Marketplace," *Proceedings of the 23rd International Symposium on Computer Architecture*, pages 308–317, May 1996) and Data General (R. Clark and K. Alnes, "An SCI Interconnect Chipset and Adapter," *Symposium Record, Hot Interconnects IV*, pages 221–235, August 1996) disclose machines that interconnect multiple quad Pentium Pro nodes into a single shared-memory system. These two systems both utilize an SCI-based interconnect, a micro-coded controller, and a large per-node cache. The use of the SCI coherence protocol prevents close coupling of the inter-node coherence mechanism to the intra-node (snoopy) coherence mechanisms. The mismatch between the two protocols requires the use of a large L3 (node-level) cache to store the coherence tag information required by the SCI protocol, to correct the mismatch of cache line size, and to adapt the coherence abstraction presented by the processing node to that required by SCI. In addition, the complexity of the SCI coherence protocol invariably leads to programmable implementations that are unable to keep up with the pipeline speed of the processor bus, and that can only process one request at a time. The result is a coherence controller that is large, expensive, and slow.

What is needed is an inter-node coherence mechanism that is simple, fast, and well-matched to the pipelined snoopy protocol. Such a mechanism can be very tightly coupled to the processor bus and can thus achieve higher performance at lower cost.

SUMMARY OF THE INVENTION

This invention includes the cache coherence protocol for a sparse directory in combination with multiprocessor nodes, each node having a memory and a data bus operating under a pipelined snoopy bus protocol. In addition, the invention has the following features: the current state and information from the incoming bus request are used to make an immediate decision on actions and next state; the decision mechanism for outgoing coherence is pipelined to follow the bus; and the incoming coherence pipeline acts independently of the outgoing coherence pipeline.

The invention implements the cache coherence protocol within a cache coherence unit for use in a data processing system. The data processing system is comprised of multiple nodes, each node having a plurality of processors with associated caches, a memory, and input/output. The processors within the node are coupled to a memory bus operating according to a "snoopy" protocol.

Multiple nodes are coupled together using an interconnection network, with the mesh coherence unit acting as a bridge between the processor/memory bus and the interconnection network. The mesh coherence unit is attached to the processor/memory bus and the interconnection network. In addition, it has a coherence directory attached to it. This directory keeps track of the state information of the cached memory locations of the node memory. The mesh coherence unit follows bus transactions on the processor/memory bus, looks up cache coherence state in the directory, and exchanges messages with other mesh coherence units across the interconnection network as required to maintain cache coherence.

The invention incorporates close coupling of the pipelined snoopy bus to the sparse directory. In addition, the invention incorporates dual coherence pipelines. The purpose of having dual coherence pipelines is to be able to service network requests and bus requests at the same time in order to increase performance. Finally, the invention incorporates a coherence protocol where all protocol interactions have clearly defined beginnings and endings. The protocol interactions end the transactions on a given line before the interaction of a new line may begin. This process is achieved by the invention keeping track of all the transient states within the system.

BRIEF DESCRIPTION OF THE DRAWINGS

FIG. 1(*a*) is a block diagram illustrating a multiprocessor system having a plurality of nodes connected via a mesh coherence unit to an interconnect;

FIG. 1(*b*) is a block diagram of a node of FIG. 1(*a*);

FIG. 2(*a*) is a block diagram of an individual node of FIG. 1(*a*) in further detail;

FIG. 2(*b*) is a block diagram of a P6 segment of FIG. 2(*a*);

DETAILED DESCRIPTION OF THE INVENTION

Figure 1A:
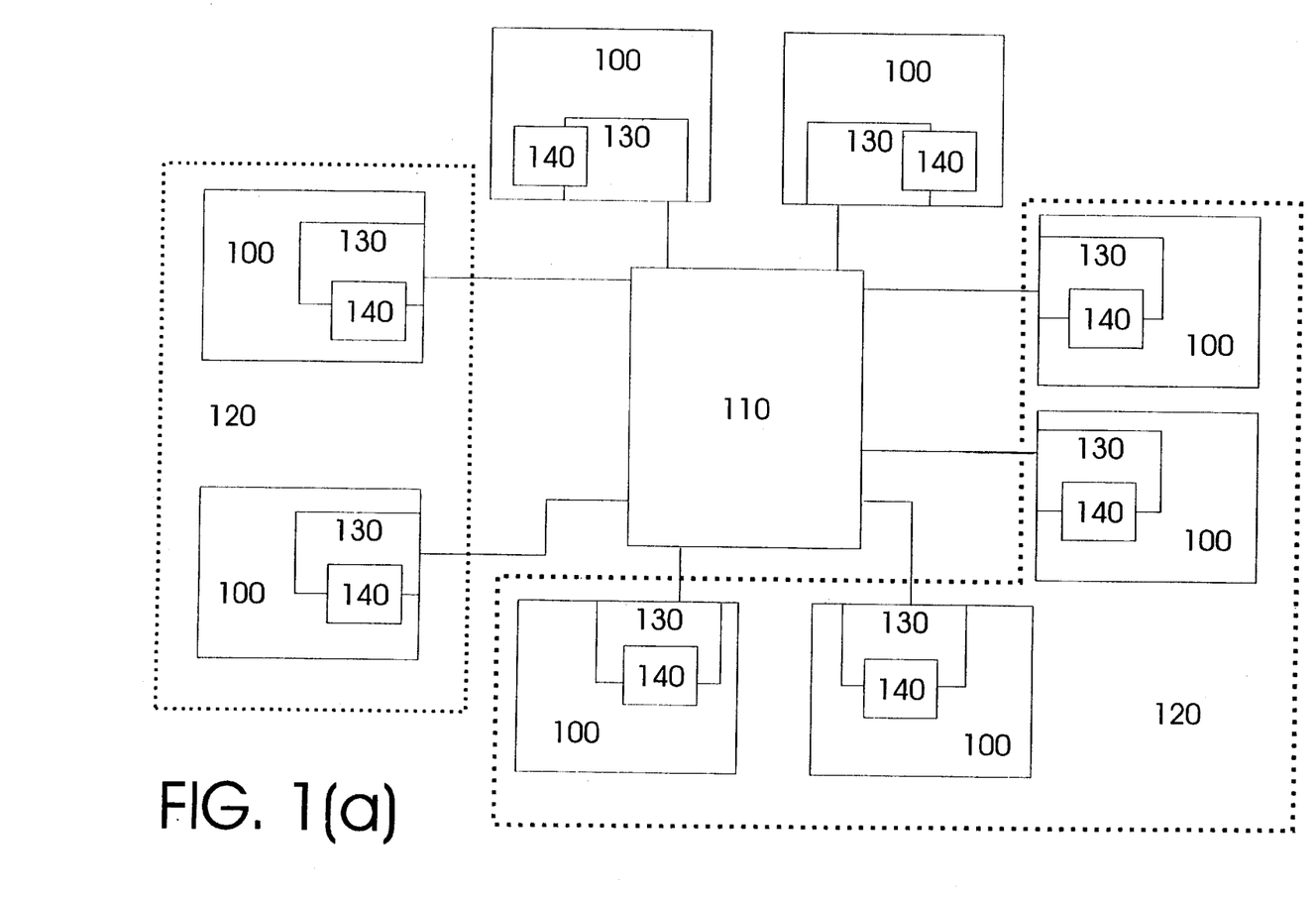
Figure 1B:
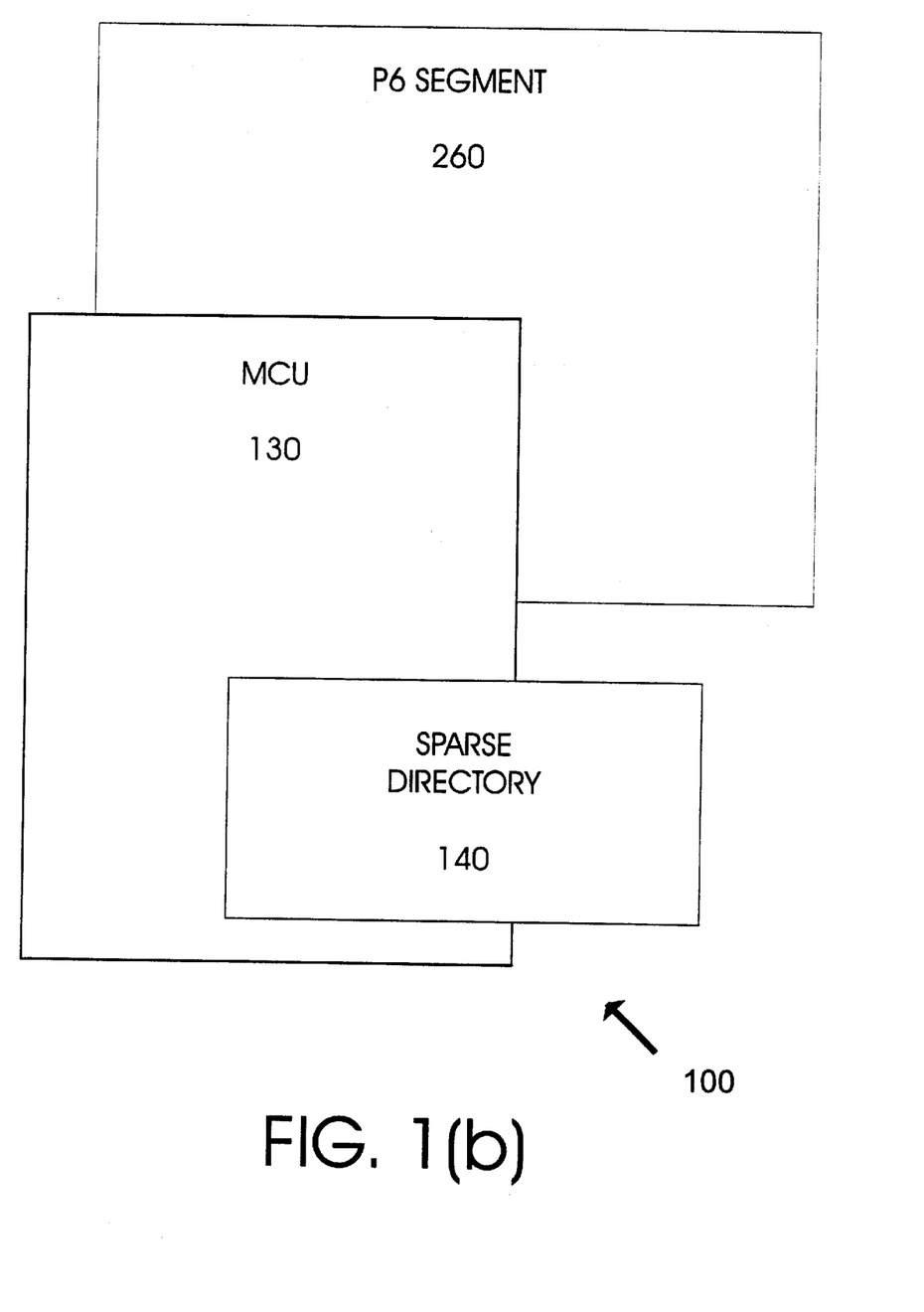

Referring to FIGS. 1(*a*) and 1(*b*), a plurality of nodes 100 are coupled to Interconnect 110, which enables nodes 100 to share information either by a message-passing mechanism, a shared-memory mechanism, or a hybrid of the two mechanisms. In the preferred embodiment, up to four nodes 100 are coupled together in a shared-memory mechanism to create a shared-memory site 120. The nodes are connected to Interconnect 110 via a Mesh Coherence Unit 130. Each Mesh Coherence Unit 130 is coupled to an associated Sparse Directory 140.

Figure 2A:
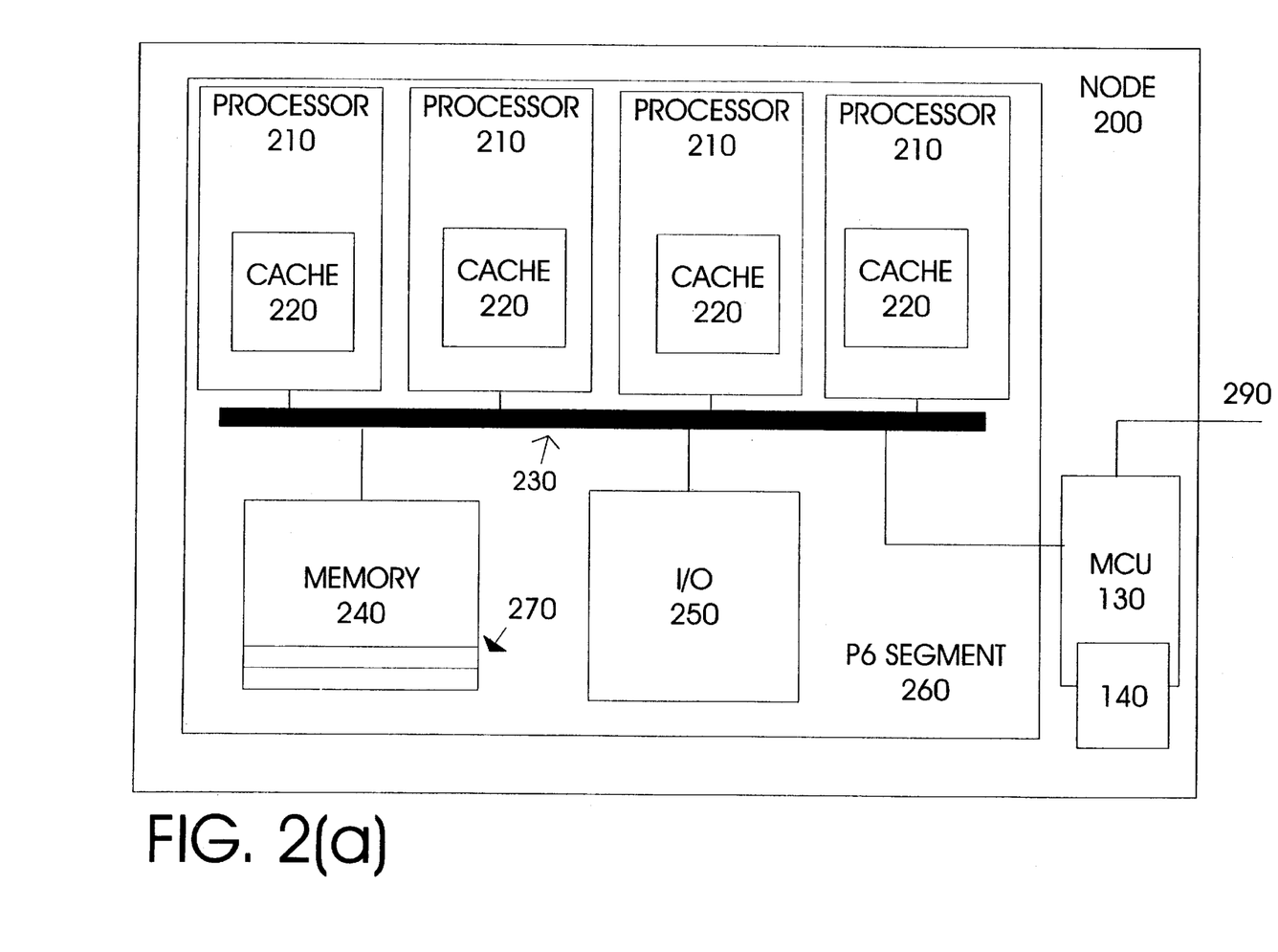
Figure 2B:
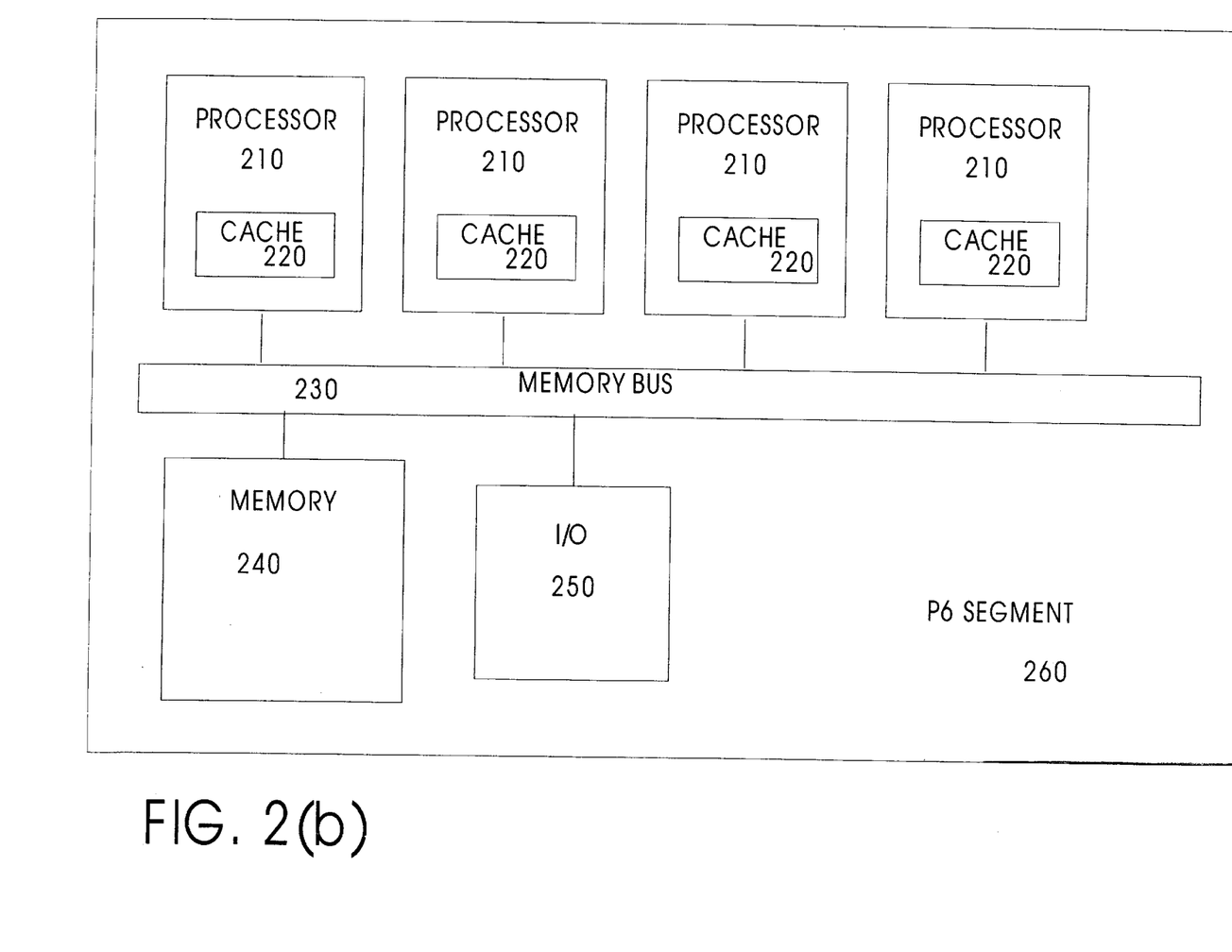

Referring now to FIGS. 2(*a*) and 2(*b*), node 200 of the cluster shown in FIG. 1(*a*) is shown. Four processors 210, together with their associated caches 220, are coupled to memory bus 230. In the present embodiment, memory bus 230 operates according to a snoopy bus protocol. In addition, associated memory 240 and input/output 250 of the processors are attached to bus 230. In the preferred embodiment, Quad-P6 segment (P6 segment) 260 contains standard high volume Intel processor-based SMP nodes made up of four Pentium® Pro processors, up to 1 GByte of DRAM, and two PCI buses for attaching I/O. The P6 segment 260 is shown in FIG. 2(*b*).

The P6 segment 260 maintains coherency within the segment by the use of a snoopy bus protocol. Within P6 segment 260, each associated cache 220 snoops or monitors all transactions with main memory 240 by all other caches 220 within segment 260. In this way, each cache 220 within the P6 segment 260 is aware of all memory lines 270 within memory 240 that are transferred from main memory 240 to a cache 220.

Mesh Coherence Unit (MCU) 130 is coupled to both P6 segment 260 via memory bus 230 and to Interconnect 110. All inter-node communication is passed through MCU 130. P6 segment 260, together with MCU 130, makes up current node 200. MCU 130 coordinates the flow of instructions and data between current node 200 and the other nodes 100 connected to Interconnect 110. MCU 130 maintains the cache coherence between nodes 100 within shared-memory site 120 and extends the P6 bus functions over the mesh to connect multiple nodes 100 together. Nodes 100, together with the Interconnect 110, make up a cluster. The nodes within a cluster, both within shared memory sites 120 and those outside the sites, may be located physically close to one another or may be distributed at a distance. Within a site 120, coherency is maintained between nodes 100 by the MCU 130 and coherency is maintained within node 200 by the standard P6 snoopy bus protocol. In the preferred embodiment, coherency within site 120 is maintained by hardware; however, those familiar to the art will recognize that site coherency could also be maintained in software or firmware.

As will be described in detail below, MCU 130 maintains inter-node coherency by implementing a directory-based, cache coherence protocol. MCU 130 keeps track of cache lines accessed by remote nodes 100 and the cache line status within current node 200 with sparse directory 140. The MCU 130 also supports Message Passing and Memory Copy between nodes both inter- and intra-site. In the preferred embodiment, MCU 130 is a single custom CMOS chip. Sparse coherence directory 140 is stored in standard, off-the-shelf SRAM chips. In the present invention, only three 1 Mbit chips are required for a total directory size of less then 0.5 MByte. A comparable full-directory design with 6 bits of state for every cache line would require 24 MByte of storage per GByte of main memory.

Figure 3:
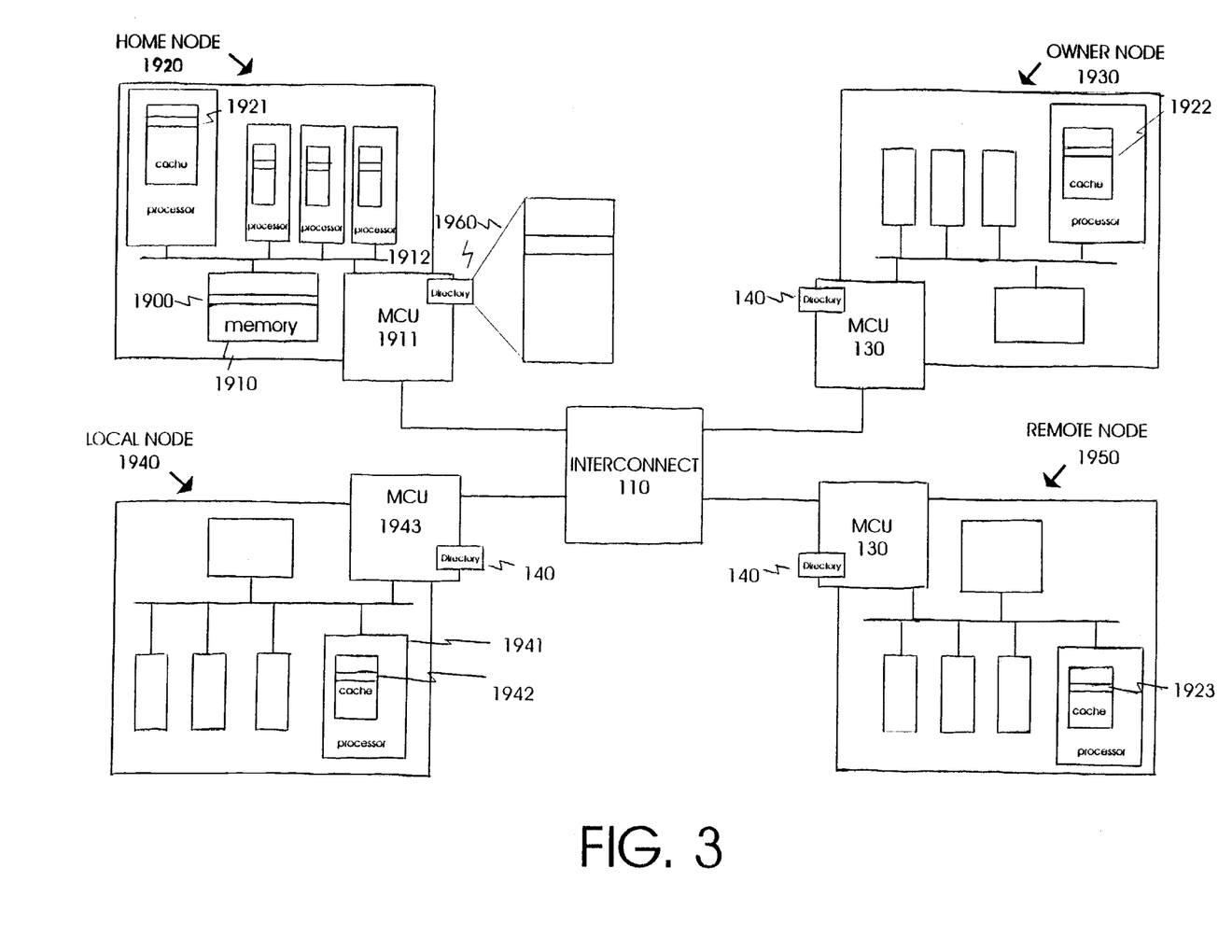
FIG. 3 is a block diagram illustrating one embodiment of a shared memory site of FIG. 1(*a*)

Now referring to FIG. 3, one embodiment of the present invention is shown. Cache coherence within the system is maintained on two levels. On one level, cache coherence is maintained within individual nodes 200 by a snoopy bus protocol. On the second level, MCU 130 maintains cache coherence between nodes 100 by using an invalidating, directory-based cache coherence protocol. Memory line 1900 is one cache line's worth of data stored in memory 1910 (240) at a particular address. Home node 1920 is the particular node where a cached memory line physically resides. A memory line 1900 can be cached locally 1921 at the home node 1920 or remotely in one or more processor caches 1922 or 1923. When a memory line 1900 is cached remotely, the line is either unmodified (clean) 1923 or modified (dirty) 1922. Owner node 1930 is the particular node that has control of memory line 1900 with the ability to update the line. The owner node 1930 is said to own a dirty copy 1922 of the memory line 1900. A remote node 1950 is said to have a clean copy 1923 of the memory line 1900 and is referred to as a "sharer" node. A local node 1940 is the node 200 where a current memory request originates. Any node that is not the home or local node is called a remote node 1950.

Each MCU 1911 (130) maintains a directory to track its own memory lines 1900 in use by remote nodes 1930, 1940, 1950. The home node directory 1960 (140) tracks those nodes 200 that have requested a read-only copy 1923 of the cache line 1900 so that when a node wants to update a line 1900, the directory 1960 (140) knows which nodes to selectively invalidate. In addition, the directory 1960 (140) tracks the node, if any, that owns the memory line 1900. The home node 1920 knows all the remote nodes 1950 within the shared-memory site 120 that have requested a read-only copy of the home node's 1920 memory line 1900, and also the remote node 1930 that has requested write access to the memory line 1900. When home node 1920 must communicate with remote nodes 1930, 1950, it does so selectively based upon which nodes have accessed the line rather than to all nodes within site 120. Thus, the directory-based cache coherence protocol achieves coherence by point-to-point communication between nodes 100 rather than broadcast invalidation.

When processor 1941 requests memory line 1900, its cache 1942 is checked to determine whether the data is present in the cache. If processor 1941 finds the data in cache 1942 (a "cache hit"), cache 1942 transfers the data to processor 1941. If processor 1941 does not find the data in cache 1942 (a "cache miss"), the processor issues a request onto P6 memory bus 230 for the data. The bus request includes the real address of memory line 1900 and the identification of home node 1920 for memory line 1900. If memory line 1900 resides on a different node, MCU 1943 (130) of local node 1940 generates a network request for the cache line 1900 across Interconnect 110 to home node 1920. When the MCU at home node 1911 (130) receives the network request, it stages the request onto home node's memory bus 1912 (230). The network request then snoops bus 1912 (230) to determine if memory line 1900 is cached locally 1921. If not cached, the network request obtains control of memory line 1900 in the node's memory 1910 (240). Thus, the action of MCU 1911 (230) at home node 1920 is like the action of a local processor 210 accessing memory line 1900 within node 200. Depending on the status of memory line 1900, MCU 1911 (230) will take the appropriate action to give the requested memory line 1900 to local node 1940. If local node 1940 has requested an update of line 1900, local node 1940 becomes the owner node; if local node 1940 only requests read capacity, it becomes a sharer. Only one node 200 may be the owner of a memory line 1900 at any one time.

When an owner node 1930 finishes accessing a memory line 1900, the owner node 1930 must notify the home node 1920 that it no longer requires access to line 1900. If owner node 1930 has modified the data, line 1900 must be updated at home node 1920. This process is termed a "writeback" of the data.

If home node 1920 needs to regain control of memory line 1900, line 1922 may be flushed back to home node 1920 or flushed forward to another remote node 1940 if the remote node requires access. Owner node 1930, upon receiving a flush back request, returns the control of memory line 1900 to home node 1920. Upon receiving a flush forward request, owner node 1930 transfers memory line 1900 to a remote node 1940, which becomes the new owner node.

Figure 4:
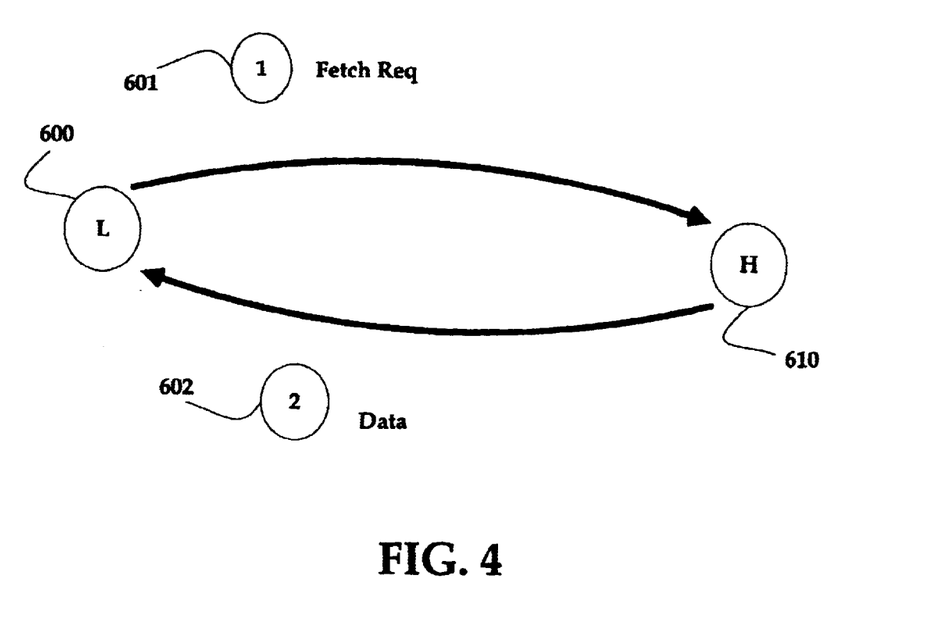
FIG. 4 illustrates the state transitions of the cache coherency protocol during a remote read miss.

Referring now to FIG. 4, the state transitions upon a read of a memory line 270 is illustrated. When a remote read by a processor 210 results in a cache miss and the local node 600 must obtain memory line 270 from home node 610. Local node 600 first determines that memory line 270 is not in cache 220 (read miss). Local MCU 130 requests a fetch 601 from home node 610 for memory line 270 using a fetch request message. If memory line 270 is not dirty (owned by another node), home node 630 returns with a data message 602.

Figure 5:
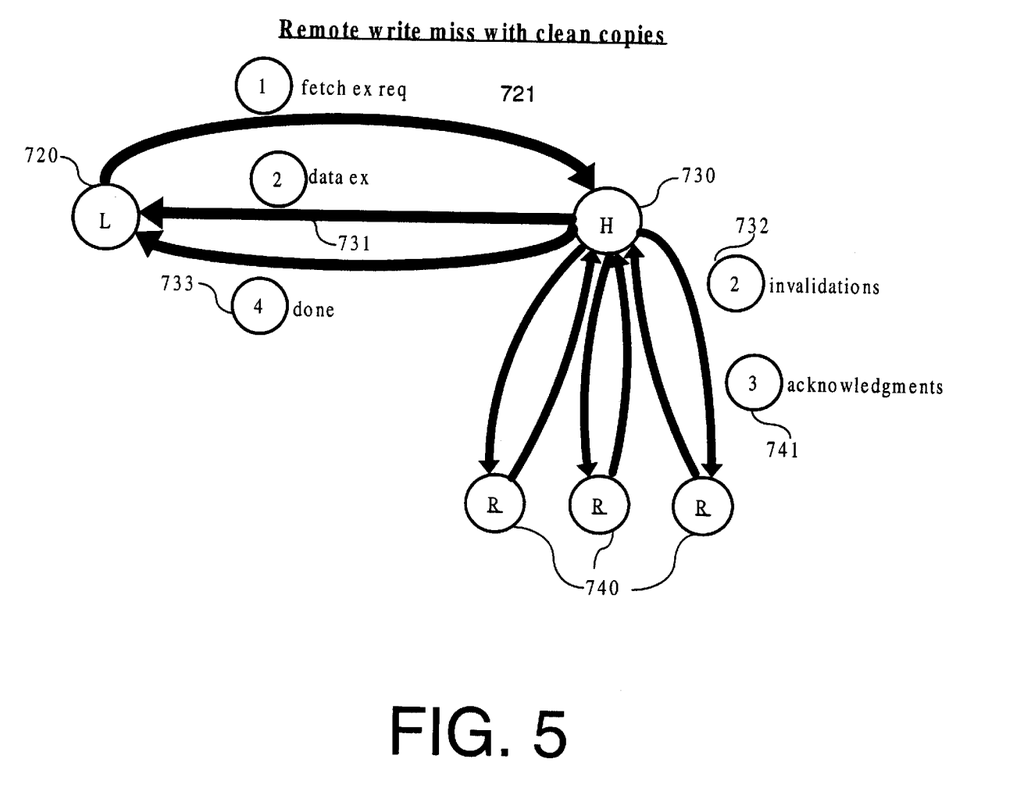
FIG. 5 illustrates the state transitions of the cache coherency protocol for a remote write miss with clean copies.

Referring now to FIG. 5 the state transitions on write requests by a remote node to the home node where one or more remote nodes have cached, read-only copies of the requested line is illustrated. In this transition, only read-only copies are cached and no node has ownership of the line at the beginning of the sequence. After a cache miss, local node 720 sends the fetch exclusive request 721 to home node 730. Home node 730 sends back the data and ownership of line 270 to local node 720 via the data exclusive message 731. Simultaneously, home node 730 sends invalidation instructions 732 to the remote nodes 740 with cached, read-only copies of memory line 270. Remote nodes 740 immediately acknowledge the receipt of the invalidation 741 when the invalidation is received in Mesh Interface 350 of the remote nodes 740. When home node 730 receives acknowledgments 741 from all remote nodes 740 with cached copies, home node 730 notifies local node 720 with the done message 733. At this point, local node 720 is the owner of line 270.

Figure 6:
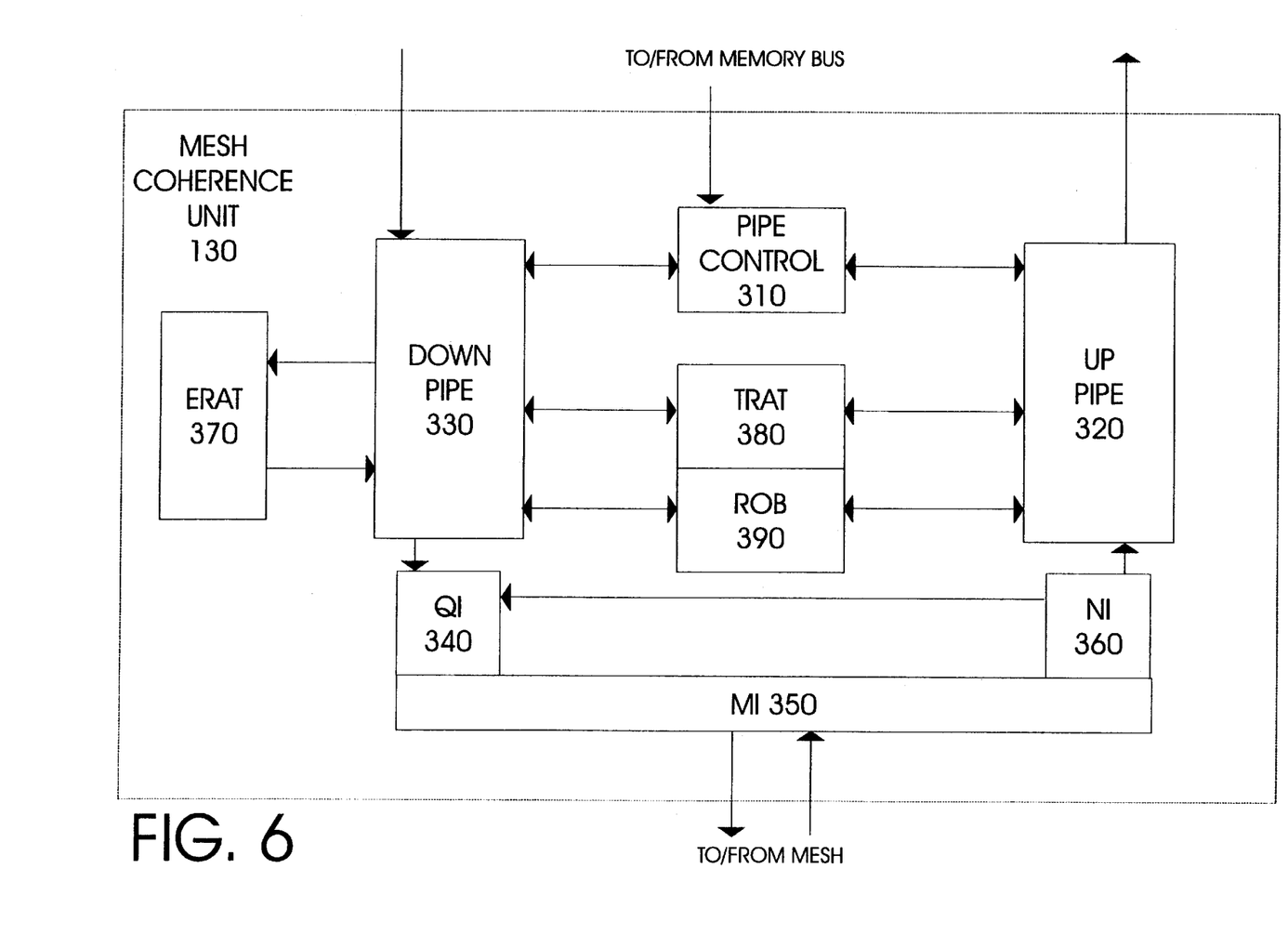
FIG. 6 is a block diagram of the mesh coherence unit.

Referring now to FIG. 6, a block diagram of the Mesh Coherence Unit (MCU) 130 is shown. The Pipe Control (PC) 310 arbitrates for control of P6 memory bus 230 during different bus phases of Up Pipe (UP) 320 and Down Pipe (DP) 330. Requests that arrive from P6 bus 230 are turned into network requests by DP 330 and are then sent to Queue Interface (QI) 340. The network requests are dispatched over the mesh by Mesh Interface (MI) 350. Remote requests from the mesh are received by MI 350 and passed to Network Interface (NI) 360, which generates either bus requests that are passed to the UP 320 or network requests that are passed to the QI 340. UP 320 requests P6 bus 230 arbitration from PC 310, and UP 320 sources the requests onto the P6 bus 230 once arbitration has been won by the PC 310. The Exported Real Address Table (ERAT) 370 maintains cache coherence information while Temporary Real Address Table (TRAT) 380 and Remote Outstanding Operations Buffer (ROB) 390 keep track of cache lines in transition.

ERAT 370, TRAT 380, and ROB 390 together make up the sparse directory 140. The sparse directory 140 is a set associative directory. The specific functions of directory 140 are discussed in detail below.

Down Pipe (DP) 330 transforms the P6 bus requests into network requests. DP 330 maintains coherence during a P6 bus request in three phases: the request phase, the snoop phase, and the response phase. During the request phase, DP 330 records the P6 request phase signal in a history queue. The history queue holds up to eight outstanding requests on the bus for a reply and nine requests of data transfer. The request is held in the queue until the DP 330 is ready to process the request.

DP 330 processes the bus request during the snoop phase. During this phase, the bus request address is sent to ERAT 370 for lookup and the ERAT data bus is switched for an ERAT read. The bus requests are translated into network requests with the use of a Coherence Action Table. The network requests are prepared for output to QI 340 and the ERAT 370, ROB 390, and TRAT 380 entries are updated as required.

The Queue Interface (QI) 340 creates the packets for transfer to the remote nodes and passes the completed packets to Mesh Interface (MI) 350. QI 340 receives a request or command from either DP 330 or NI 360. QI 340 stores the request in an output queue. If the request contains data, QI 340 must hold the request in abeyance until it receives the associated data from DP 330. Once QI 340 receives the data, QI 340 consolidates the request and data together into a single packet. The transfer of data usually occurs sometime after QI 340 receives the request. Requests to transfer data are always bus 230 initiated requests, while requests initiated by NI 360 are command requests only.

NI 360 receives packets from Interconnect 110 through MI 350. NI 360 decodes the packet and determines whether to send the P6 messages to UP 320, send mesh messages to QI 340, or to update ROB 390 and TRAT 380 entries. The detailed operation of NI 360 is discussed below.

Up Pipe (UP) 320 receives bus requests from NI 360. UP 320 requests bus arbitration from Pipe Control (PC) 310. Once PC 310 notifies UP 320 that arbitration has been won, UP 320 sources the bus request onto P6 memory bus 230. Depending upon the request received from NI 360, UP 320 may also deallocate ROB 390 or TRAT 380 entries for the incoming transient request.

Figure 7:
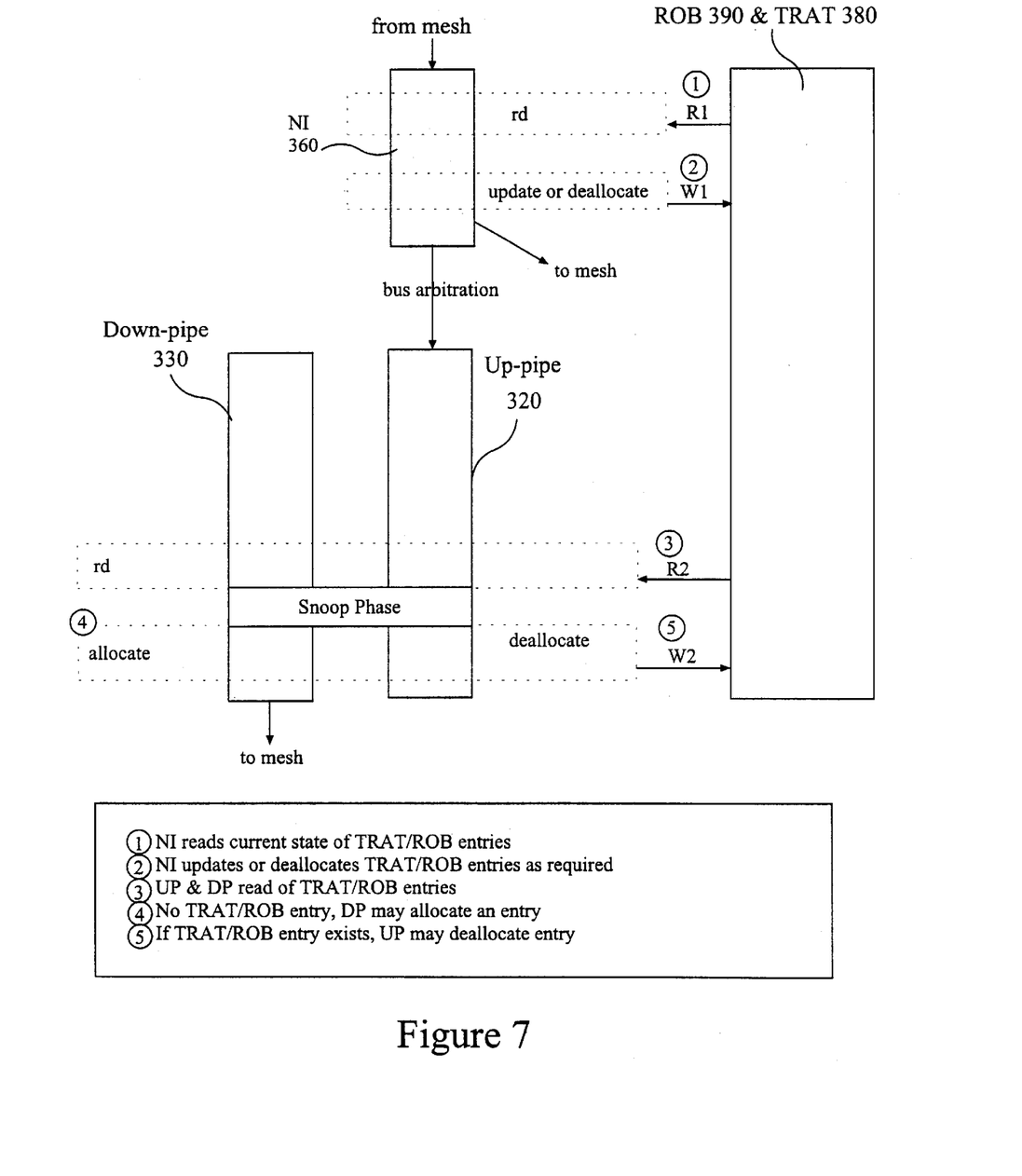
FIG. 7 is a block diagram illustrating the relationship of the TRAT, ROB, NI, UP, and DP.
Figure 8:
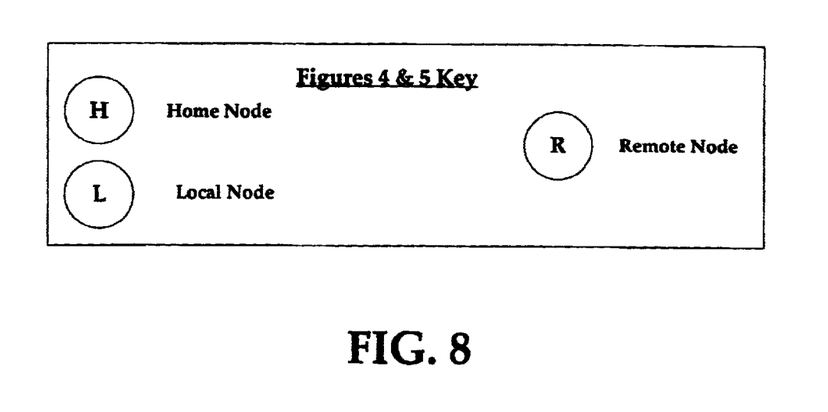
FIG. 8 is a diagram of the symbols used in FIGS. 4 and 5.

Referring now to FIG. 7, the interaction between ROB 390/TRAT 380 combination and UP 320, DP 330, and NI 360 is shown. When NI 360 receives a network request, it reads ROB 390/TRAT 380 entry for the request to determine the request's current transition state. NI 360 updates or deallocates the ROB 390/TRAT 380 entry as required by the request. During the snoop phase as described above, DP 330 reads the ROB 390/TRAT 380 entries to determine the current transient state of a given memory line. If no ROB 390/TRAT 380 entry exits for a given line, and the ROB 390/TRAT 380 is not full, DP 330 may allocate an entry within ROB 390/TRAT 380. Similarly, UP 320 reads the ROB 390/TRAT 380 for a given memory line. UP 320 may deallocate the entry in TRAT 380 depending upon the response that is received from NI 360. UP 320, NI 360, and DP 330 are each pipelined to handle multiple bus transactions or network requests at the same time. Through the use of the ROB 390 and TRAT 380, as described above, the UP 320, NI 360, and DP 330 coordinate their actions to operate independently and in parallel when the addresses of the request they are processing are independent. In this manner, a high-performance, coherence protocol processing engine is achieved.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in combination with systems other than the one described above as the preferred embodiment. Therefore, these and other variations upon the preferred embodiments are intended to be covered by the present invention, which is limited only by the appended claims.

What is claimed is:

1. A cache coherence unit for use in a data processing system having multiple nodes, each node having a plurality of processors coupled to a memory bus operating according to a cache coherence protocol, each processor having an associated cache memory for caching data, the cache coherence unit comprising:
   a bus interface element coupled to said memory bus;
   a coherence control element coupled to said bus interface element and coupled to said cache memories;
   a sparse directory coupled to said coherence control element for storing node identifications and information of locations in said cache memories; and
   a protocol decision pipeline coupled to said coherence control element for processing concurrent requests for cache memory.

2. The cache coherence unit of claim 1, wherein the coherence control element and the sparse directory have incoming and outgoing ports.

3. The cache coherence unit of claim 1, wherein the sparse directory stores state information characterizing a current transient state and other transient states.

4. The cache coherence unit of claim 3, wherein said coherence control element updates said information characterizing the current transient state.

5. The cache coherence unit of claim 3, wherein said coherence control element updates said information characterizing the current transient state and then updates said information characterizing other transient states.

6. The cache coherence unit of claim 1, wherein said coherence control element comprises:
   means for updating information characterizing a current transient state,
   means for reading information characterizing other transient states, and
   means for updating said information characterizing other transient states after said information characterizing the current transient state has been updated.

7. The cache coherence unit of claim 1, being capable of:
   concurrently handling multiple memory bus requests; and
   concurrently handling multiple network request.

* * * * *